US007210620B2

(12) United States Patent
Jones

(10) Patent No.: US 7,210,620 B2
(45) Date of Patent: May 1, 2007

(54) SYSTEM FOR FACILITATING ONLINE ELECTRONIC TRANSACTIONS

(75) Inventor: Michael William Jones, Whitefish, MT (US)

(73) Assignee: Ameriprise Financial, Inc., Minneapolis, MN (US)

( * ) Notice: Subject to any disclaimer, the term of this patent is extended or adjusted under 35 U.S.C. 154(b) by 15 days.

(21) Appl. No.: 10/905,439

(22) Filed: Jan. 4, 2005

(65) Prior Publication Data

US 2006/0144925 A1 Jul. 6, 2006

(51) Int. Cl.
*G06K 5/00* (2006.01)
*G06Q 30/00* (2006.01)
(52) U.S. Cl. .......................................... 235/380; 705/26
(58) Field of Classification Search ................ 235/380, 235/375; 705/26, 35, 39–42, 64–79
See application file for complete search history.

(56) References Cited

U.S. PATENT DOCUMENTS 5,671,279 A * 9/1997 Elgamal ..................... 705/79
5,903,878 A * 5/1999 Talati et al. ................. 705/26
6,029,150 A * 2/2000 Kravitz ....................... 705/39
6,327,578 B1 12/2001 Linehan
6,853,987 B1 * 2/2005 Cook .......................... 705/75
2001/0027441 A1 * 10/2001 Wankmueller ............... 705/41
2003/0236777 A1 * 12/2003 Conway ....................... 707/3
2004/0015413 A1 * 1/2004 Abu-Hejleh et al. .......... 705/26
2005/0038715 A1 * 2/2005 Sines et al. .................. 705/26

FOREIGN PATENT DOCUMENTS

WO    WO 2004/079603      9/2004

* cited by examiner

*Primary Examiner*—Jared J. Fureman
*Assistant Examiner*—April A. Taylor
(74) *Attorney, Agent, or Firm*—Snell & Wilmer L.L.P.

(57) ABSTRACT

The invention provides systems and methods within existing business and technology infrastructures and processes for facilitating an electronic transaction including payment by an account issuer to a merchant for online purchases by a consumer. The invention uses a web services model including request and response messages to provide simplified authentication and authorization through entry of the consumer's PIN, without the release of the consumer's account or billing information to the merchant. The invention reduces authorization processing, and reduces the transaction fees for online transactions, increasing the viability of lower value transactions.

10 Claims, 3 Drawing Sheets

SYSTEM FOR FACILITATING ONLINE ELECTRONIC TRANSACTIONS

FIELD OF INVENTION

The present invention generally relates to facilitating electronic payment transactions for online content or low value products and services, and to enabling payments to online merchants using a card issuer's existing infrastructure and processes, while eliminating the need to disclose consumers' financial data to merchants.

BACKGROUND OF INVENTION

Popular acceptance of the Internet as a viable marketplace has led online merchants to offer an increasing number of digital products for on-demand purchase and delivery. On-demand or downloadable music, movies, pictures, radio, TV programming, news, stock tips, audio books, house plans, ring tones, games, ebooks, and legal forms are just a few examples of available digital online content. Much of this content is valued at less than ten dollars with many of these products, such as individual song tracks, costing less than a dollar. "Low value" payments of less than twenty dollars are often referred to as "small payments" and those less than five dollars are often referred to as "micropayments." The two terms are used interchangeably herein.

The value or size of micropayments often makes processing overhead and customer service costs disproportionately expensive. Transaction costs in conventional payment systems have long been a deterrent to vendors, both online and in stores, burdening or eliminating any profitability from low value transactions. The recent explosion of the digital music download market, such as Apples' I-tunes website, reflects widespread demand for "pay-as-you-go" products and services. Demonstrated success in this arena has spurred many vendors to bring additional products into the online marketplace.

Despite popular demand for low value online content, high payment processing costs for small transactions remain a challenge for retailers and the payment product industry has remained skeptical of the profitability of micropayments. The viability of this emerging market will hinge largely on optimizing overhead and transactional efficiency. Additionally, consumers and merchants alike are seeking more security and privacy in online transactions.

Earlier micro-payment systems add redundant administrative and transaction costs to the already costly merchant-consumer-funding institution interaction. Two such systems that have met with some success are the PayPal® and Peppercoin® payment systems. For example, PayPal's lowest offered rates amount to a 32% surcharge on a 99-cent, low-value transaction. The Peppercoin® system utilizes probabilistic deposit protocols or statistical algorithms to aggregate the value of small value online transactions to submit one larger payment request. Peppercoin's per-transaction fee for a 99-cent transaction may still be as high as 10 cents.

These high transaction costs are due in part to the redundancy of features offered and charged for by both the intermediary and the pre-existing payment network manager, such as, for example, micropayment processing (authorization, record-keeping, reconciling, statementing, etc.), customer service, account maintenance, fraud losses, risk management, billing, and consumer-merchant dispute resolution.

Earlier proposed systems have typically required, inter alia, (i) additional software, (ii) registration, authorization and transaction processes, and/or (iii) administration and transaction expenses (e.g. redundant reconciliation and billing processes, etc.). In short, previous transaction systems have not sufficiently met the demands for optimized overhead and transaction efficiency because such systems operate separate from and in addition to existing banking and electronic commerce systems. As such, available payment systems remain overly burdensome to micro-payment online transactions and/or provide inadequate privacy and security to online consumers. There is, therefore, a need for systems and methods to facilitate lower cost, secure, convenient transactions for the purchase of online content and low value products.

SUMMARY OF INVENTION

The present invention facilitates secure online content micropayments between a card holder or consumer and a merchant through a payment manager or issuer (e.g., charge, credit, debit, or rewards card issuer) with reduced consumer-merchant-issuer interaction. The system uses a web services model including request and response messages to provide a simpler form of authentication (e.g., personal identification number ("PIN") entry) without the release of private card holder billing information to merchants. The system thus enables reduced authorization processing within existing business and technology infrastructures to reduce transaction fees for online content transactions. Reduced transaction costs will enable merchants to offer new online content products and markets. For example, markets such as cable programming that have relied on subscription revenues may be able to shift toward pay-per-use revenues.

An exemplary payment process includes a consumer offering to purchase online content through a consumer terminal, and specifying a particular issuer as the source or method of payment. The merchant sends a payment request to the issuer (e.g., American Express, VISA, MasterCard, Discover, AT&T, MCI, etc.) who automatically sends an authorization request to the consumer's terminal. The consumer then authorizes the payment by entry of a PIN or other secure ID authentication (e.g. ID-password combination, biometric, smart card, transponder, etc.). The issuer performs the necessary or desired internal credit authorization procedures and sends an authorization confirmation message to the merchant terminal. The merchant then completes the transaction by releasing or transmitting the online content to the consumer.

The issuer then uses conventional reconciliation processes with the merchant, and bills the card holder the charges on the card holder's regular periodic statement. Payments for online content is thus facilitated through existing, trusted intermediaries and secure card holder authorization procedures (e.g., PIN entry). Throughout this process, the consumer's charge card number (or any other personal information) is not transmitted to the merchant or to any other third party. Also, neither merchants nor card holders are burdened with establishing or managing redundant accounts or contracts for each transaction.

Various embodiments of the present transaction system incorporate, and improve upon, existing or developing technologies, such as, for example, non-currency based programs and loyalty systems, electronic lines of credit, online banking, etc.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

DETAILED DESCRIPTION

Figure 1:
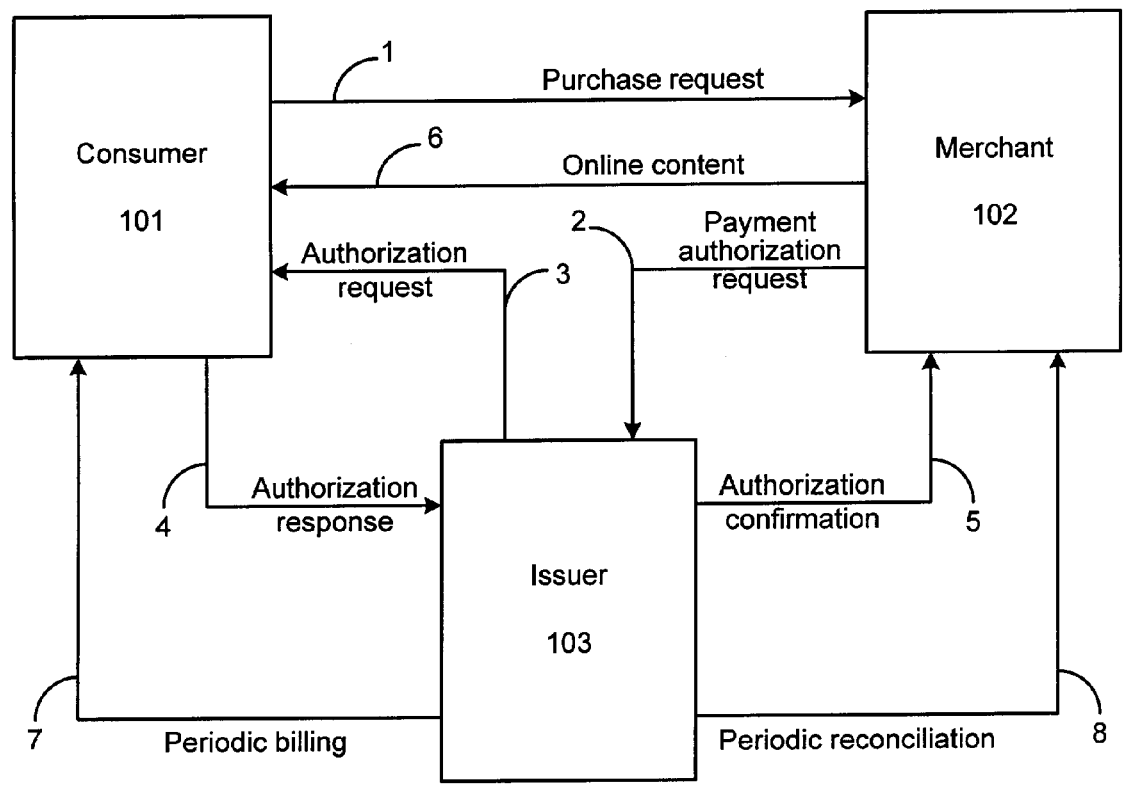
FIG. 1 is a flow diagram illustrating an exemplary system configured to facilitate a transaction according to one embodiment of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a unique system for facilitating online transactions including reduced authorization processes within existing commercial transaction processing systems. A "transaction," as defined herein, includes, inter alia, any exchange or delivery of value, exchange or delivery of data, gifting of value or data, etc. The term "transaction" not only contemplates an exchange of goods or services for value from one party to another, but also the gifting of something from one party to another. Additionally, transaction codes or charge card numbers are account numbers that are used to facilitate any type of transaction.

While the system may contemplate upgrades or reconfigurations of existing processing systems, changes to card holder or merchant systems are not required by the present invention. For example, the present system may contemplate, but does not require: downloading of software modules; a digitally-based, non-physical commerce card; and certain embodiments may require the existing customer to register for the online service. The transaction system herein described may be integrated into current electronic commerce processes with minimal or no changes to existing systems used by card holders or merchants.

The invention generally relates to transaction systems and methods where a consumer (also referred to as a "card holder") pays a merchant through a payment manager (also referred to as an "issuer").

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, Understanding DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, biometrics, grid computing and/or mesh computing.

With reference to FIG. 1, a consumer 101 and a merchant 102 interact with a payment manager (referred to as "issuer") 103 to accomplish payment for online content to be transferred from merchant 102 to consumer 101. Consumer 101 may include any individual, business, entity, software and/or hardware that initiates any transaction. In an exemplary embodiment, consumer 101 establishes a new or has an existing relationship or association with issuer 103. For example, in one embodiment, consumer 101 is an American Express® card member or a participant in an airline's frequent flyer rewards program. Consumer 101 may be a member of any suitable organization that provides transaction products or services. Consumer 101 may also be referred to herein as "card holder," "card member," "user," "customer" or the like.

Merchant 102 may include any individual, business, entity, software and/or hardware that receives payment from a consumer through issuer 103, whether or not in exchange for goods or services. For example, in one embodiment, merchant 102 is an online content store such as Apples' I-tunes® store. In another embodiment, merchant 102 is a local vending machine or parking meter. In yet another embodiment, merchant 102 is a local vendor such as a dollar store. Consumer or merchant terminals may include personal computers, handheld devices, cellular phones, point-of-sale terminals (e.g., vending machines, airport and mall kiosks, parking meters, etc.) or any other device discussed herein or known in the art.

Issuer (e.g., payment manager) 103 may include any provider of products and/or services that facilitates any type of transaction, such as banks, credit unions, charge, credit, debit or other transaction-related companies, telephone companies, or any other type of card or account issuing institutions, such as card-sponsoring companies, incentive rewards companies, or third party providers under contract with financial institutions. As contemplated by an exemplary embodiment of the invention, issuer 103 establishes and maintains account and/or transaction information for consumer 101. The term "issuer" may include any entity issuing any type of account to facilitate any transaction, exchange or service; and should not be limited to companies possessing or issuing physical cards. In an exemplary system, issuer 103 is any transaction facilitating company such as a transaction card provider like American Express, VISA, MasterCard, Discover, etc. In some instances, issuer 103 and the merchant 102 may be the same, for example, where a loyalty rewards program directly offers redemption products to program members.

Issuer 103 may provide a hierarchy of accounts or user access to accounts. For example, in one embodiment, a primary card holder grants access to other users (family members, employees) with certain limited-use parameters or restrictions established by the primary card holder. Exemplary conditions include a predetermined number of transactions, a specific dollar amount, dollar amount per transaction, maximum dollar amount per month, or combination of these or similar features.

Figure 3:
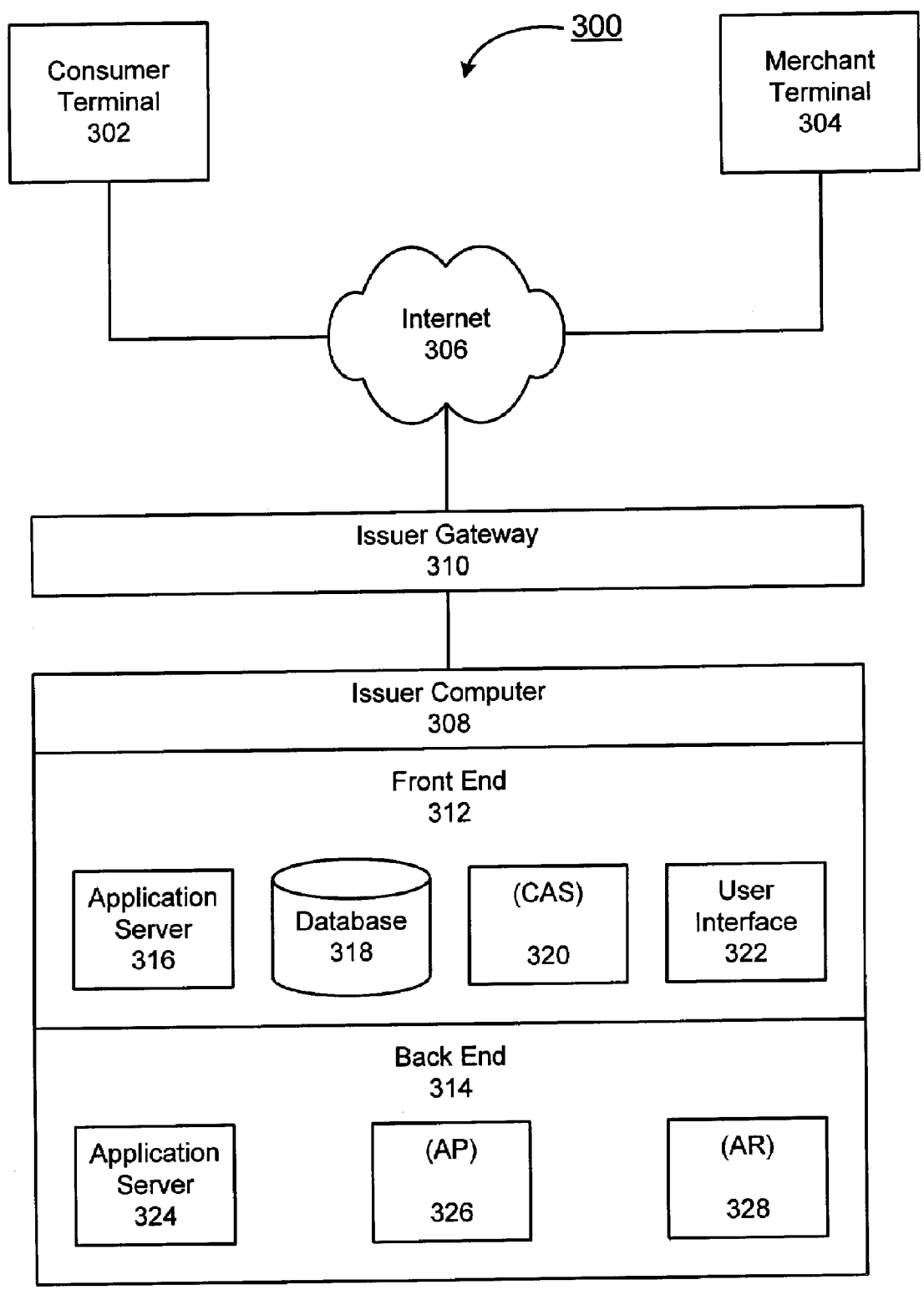
FIG. 3 is a block diagram of exemplary components of one embodiment of the present invention.

FIG. 3 depicts an overview of the components of an exemplary transaction system 300. A consumer terminal 302 and merchant terminal 304 communicate with each other and with an issuer's computer system 308 through a public network such as the Internet 306. Issuer's computer system 308 may reside in a private issuer network and may connect to the Internet 306 through an issuer gateway 310. In general, the issuer's computer system 308 utilizes front end 312 and backend 314 processing systems.

Figure 2:
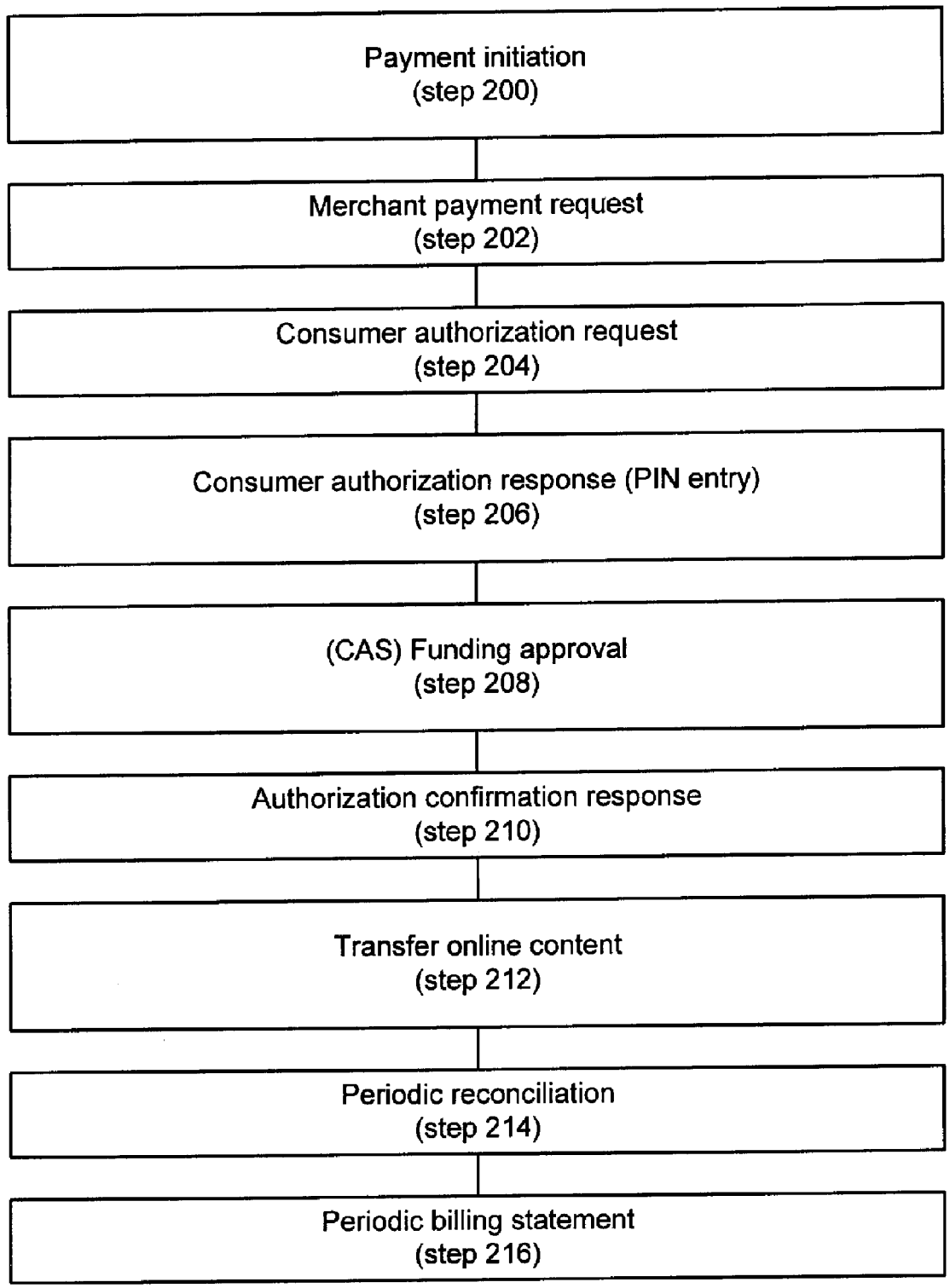
FIG. 2 is a flow diagram illustrating an exemplary method to facilitate a transaction.

Front end system 312 comprises, for example, a user interface system 4 (e.g., web server, IVR, etc.), an application server 316, a database 318, a credit authorization system (CAS) 320, and a user interface system 322. The application server 316 and database 318 may, at times, be referred to collectively as the transaction system (or service). Referring also to FIG. 2, these front end 312 components facilitate: (i) receiving a payment request from a merchant terminal (step 202); (ii) transmitting an authorization request to a consumer terminal (step 204); (iii) receiving an authorization response from the consumer terminal (step 206); (iv) performing internal credit approval (CAS) procedures (step 208); (v) transmitting an authorization confirmation response to the merchant terminal (step 210); and other practical steps such as card holder registration, verification of party identities and transaction details and the like.

Backend system 314 comprises, for example, a back-end application server 324, an accounts payable system 326 and an accounts receivable system 328. Again referencing FIG. 2, the backend 314 components facilitate periodic reconciliation or settlement with merchants, (step 214); and periodically billing of the consumer 101 (step 216). In alternative embodiments, the authorization and settlement processes may occur as separate steps or as a single step.

Consumer terminal 302 or merchant terminal 304 may interface with issuer computer system 308 through issuer gateway 310 to access the issuer's transaction services. It is through this interface that the consumer may register with the issuer and authorize payments to merchants. Similarly, through this interface merchants may request payment by the issuer on behalf of the consumer. Front end system 312 also utilizes at least one application server 316 to process incoming requests and information, apply appropriate business rules/condition sets, and generate appropriate outgoing responses. Application server 316 is configured to support interaction with, for example, user interface system 322 and database 318. An exemplary database 318 is a relational database comprising various tables for managing and translating a variety of information, such as account holder profiles, charge card data, transaction data, merchant data, conditions/rules set profiles, etc. As a practitioner will appreciate, the processing mechanisms and data structure methods can be structured in a variety of ways. In short, application server 316, and database 318 are associated with a card authorization system (CAS) 320, to process a merchant's payment authorization request and customer's authorization response.

Any databases discussed herein may include relational, hierarchical, graphical, or object-oriented structure and/or any other database configurations. Common database products include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either automatically or manually. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on a financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "user", "consumer", "customer", "card member", "business" or "merchant" may be used interchangeably with each other, and each shall mean any person, entity, machine, hardware, software or business. A bank may be part of the system, as may any number of other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the invention. The issuer has a computing center shown as a main frame computer. However, the issuer computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the issuer computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary payment networks may include the American Express®, VisaNet® and the Veriphone® networks.

In an exemplary implementation, the electronic commerce system is implemented as computer software modules loaded onto the customer computer and the merchant computing center. For example, merchant computing center may be required to adapt its consumer interface to provide payment options for selecting the issuer. For example, during the payment process, the consumer may be presented with a drop down menu to select from a list of accepted issuers.

Referring to the exemplary steps depicted in FIG. 1 and FIG. 2, consumer 101 may first be required to register to use an issuer's transaction services. While pre-registration is not required, in an exemplary embodiment, a card holder will have previously registered with card provider submitting appropriate personal information, primary charge card account numbers, and establishing a card holder ID and password for online access. The card holder ID and password may then be used for verification of card holder identity when logging into the card provider's web server and for authorizing payments. Practitioners will appreciate that verification of identity can be accomplished by a variety of means, including card holder ID and password, PIN number, SIM cards in phones, voice recognition system, biometric measurements etc.

Registration may include providing the issuer with or the issuer assigning to the consumer, a consumer identifier (e.g., account code) and consumer authorization code or PIN. The identifiers, codes, PINs, etc., may include a temporary or permanent identifier, proxy identifiers, limited use identifiers (e.g., certain merchants, certain items, certain time periods, etc), identifiers subject to certain conditions or requirements for use (e.g., parental controls, one time use only), etc. Also, practitioners will appreciate that any of the steps described herein may require or include certain practical processing of signals and information in facilitating the transmission of the described requests and responses. For example, consumers, merchants, and issuers may include any form of identification now known or later developed in the art in any of the transmitted requests or responses. Various practical methods of generating, transmitting, and processing certain transaction information such as party identifiers, payment amount, product description, etc. using digital certificates, digital signatures, tokens, virtual wallets, nonces, protocols and the like are well known in the art and receive only general coverage herein.

An "account" or "account code", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, PIN, Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. The system may include a device having a transponder which is configured to communicate with RFID reader via RF communication. Typical devices may include, for example, a key ring, tag, card, cell phone, wristwatch or any such form capable of being presented for interrogation. Moreover, the system, computing unit or any device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing institution, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identifies a particular merchant for purposes of card acceptance, account reconciliation, reporting, or the like.

Consumer 101, using a consumer terminal such as a personal computer, selects a product for purchase from a website hosted by a merchant 102. Consumer 101 thus generates a purchase request 1 indicating, whether manually or by consumer defined default, that payment will be made through issuer 103. The consumer may be able to enter a desired issuer (or any of the other entries discussed herein) in a pre-existing merchant order form or the merchant may provide a specific field or checkbox to allow selection of an issuer (or any other entries) when utilizing this invention. As such, a consumer may opt for full payment to be made from a single issuer account, or for partial payments to be made from any number of existing issuer accounts.

A software application allowing designation of an issuer may run automatically "behind" the merchants payment button. Alternatively, a transaction icon driven by an issuer-specific application residing on the consumer's computer may appear on the consumer's browser or desktop display (activator) that, appears each time the consumer initiates a checkout or purchase procedure. When the consumer clicks the payments button on the browser or the icon on the display (or the activator automatically launches the application) the merchant's payment system is directed to request payment from the specified issuer. The merchant's payment request to the issuer prompts an authorization request delivered by the issuer to the consumer. For example, in one embodiment, a pop-up window appears on the consumer's terminal, requesting consumer authorization by entry of a PIN number or the like. In another embodiment, any other security data or functionality is used in place of a PIN. Various embodiments, hybrids, and modifications of these processes should be apparent to one skilled in this art.

Purchase request 1 may include or generate some form of consumer identifier. Consumer 101 may enter an identifier (e.g., identifier pre-registered with the issuer) into a merchant form to identify consumer 101 to merchant 102 and issuer 103. Consumer 101 may also initiate payment for the item using the present invention by entering a certain code/information or selecting a certain payment option. In some embodiments, consumer 101 utilizes a digital wallet or form fill feature which automatically enters the identifier or other information into the form. Consumer 101 then transmits the form including certain data to merchant 102. As used herein, "transmit" may include sending electronic data from one system component to another over a network connection. Additionally, as used herein, "data" may include encompassing information such as commands, queries, files, data for storage, and the like in digital or any other form.

Merchant 102 receives purchase request 1 (step 200), then extracts certain information from purchase request 1 to create a payment request 2. In one embodiment, the information is extracted automatically. Any of the steps discussed herein may be carried out automatically or manually. Merchant 102 then sends a payment request 2 to issuer 103 (step 202), wherein the payment request may include the consumer identifier and any desired transaction information (e.g., payment amount, product identifier and merchant identifiers).

Issuer 103 receives payment request 2, then extracts certain information from payment request 2 to create a consumer authorization request 3. Issuer 103 then generates and transmits authorization request 3 to consumer 101 (step 204) via, for example, a pop-up window, email, pager, cell phone, personal digital assistant, and the like for consumer 101 to verify certain transaction information (e.g., merchant identity and payment amount) and to ratify the transaction. Upon receipt of authorization request 3, consumer 101 may authorize the payment by inputting a PIN or other secure form of authentication in an authorization response 4 to issuer 103 (wherein issuer may have previously stored the authentication during registration) (step 206).

In step 206 of FIG. 2, consumer 101 is requested to supply a secure authentication and authorization of the payment. Entry of the consumer's PIN number may serve both to authenticate the identity of the consumer and to authorize the payment to the merchant. Another embodiment facilitates point-of-sale consumer authentication and authorization by requiring that a consumer swipe a smart card, or the like through a reader and provide the appropriate PIN. Referring again to FIG. 3, authentication and authorization information is routed to application server 316, which then retrieves and processes information relating to the consumer's account from database 318 through CAS 320. CAS 320 performs internal credit authorizations to ensure that the proper conditions (e.g., PIN verification, existing credit, credit limits, expiration date, etc.) have been met. Failure of authorization by either the consumer or CAS 320 will result in denial of the merchant's payment request.

After internal verification of authorization response 4 and normal internal credit authorization procedures (step 208), issuer 103 sends an authorization confirmation response 5 to merchant 102 (step 210). Issuer's authorization confirmation response 5 may include a simple verification message or it may include additional information related to the consumer, the authorization or the transaction. Issuer 103 may send its authorization confirmation response 5 via an email, instant message, pop-up window or any other form of notification discussed herein or known in the art. Merchant 102 then completes the transaction with consumer 101 by transmitting the selected online content 6 (step 212). Issuer 103 may then periodically reconcile or settle with merchant 102 (step 214) and periodically bill consumer 101 for the charges (step 216). Additional steps may include handling disputes and other customer service issues.

Any of the messages or responses discussed herein may be in any format such as email, online form, data packet, etc., and may include any suitable encryption, codes, keys, signatures and the like. While an exemplary embodiment of the invention is described in association with a transaction system over the Internet, the invention contemplates any type of networks or transaction systems, including, for example, unsecure networks, public networks, wireless networks, closed networks, open networks, intranets, extranets, and/or the like.

This series of party requests and responses combined with PIN style consumer authorization reduces and optimizes the interaction of the parties to the transaction, lowering transaction costs. This, in turn, enables parties to offer and to purchase online content and low value products without transaction fees outweighing the prospective profits or savings.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Third party authorization and settlement systems and networks may be readily incorporated to form parts and/or processes of the invention. The transaction system may also interact with other programs such as a non-currency based membership rewards program, online digital wallet, online shopping gateway (e.g., American Express's ShopAMEX™ site), online gift check program (e.g. E-Gift), or other banking and transaction features that may be apparent to those skilled in the art. For example, a rewards account network system may be interfaced after or simultaneous to the above described transactions to reflect accrued or spent rewards points. Rewards points may likewise be substituted for or combined with other currencies in merchant payment, reconciliation, consumer billing processes, and the like. Membership reward points may be deducted at the time of the transaction processing, or the transaction may be reflected on the card holder's bill along with an associated credit that reflects the payment with reward points.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." Further, no element described herein is required for the practice of the invention unless expressly described as "essential" or "critical".

What is claimed is:

1. A payment system for facilitating online purchases comprising:
    a payment manager system accessible over a network by a consumer computer and a merchant computer, said payment manager system configured to receive a payment request from said merchant computer, receive a payment authorization response comprising a secure consumer authentication entry from said consumer computer and transmit a payment authorization confirmation response to said merchant computer; wherein said consumer computer is configured to receive a payment authorization request from said payment manager system and transmit said payment authorization response to said payment manager system; and, said merchant computer is configured to receive a purchase request from said consumer computer, construct said payment request and transmit said payment request to said payment manager system and receive said payment authorization confirmation response from said payment manager system, wherein a consumer computer supplied account number identifier, consumer computer identifier, and payment manager system supplied transaction information are absent from said payment request.

2. The system of claim 1, wherein said secure consumer authentication entry comprises a consumer PIN entry.

3. The system of claim 1, wherein said payment manager system is further configured to facilitate periodic reconciliation between said payment manager system and said merchant computer.

4. A computer-implemented method to facilitate online purchases through a payment manager system comprising:
    receiving a payment request from a merchant computer, wherein said payment request resulted from a consumer computer, and wherein a consumer computer supplied account number identifier, a consumer computer identifier, and payment manager system supplied transaction information are absent from said payment request;
    transmitting a payment authorization request to said consumer computer;
    receiving a payment authorization response from said consumer computer comprising a secure consumer authentication entry; and
    sending an authorization confirmation response to said merchant computer.

5. The method of claim 4, wherein the step of sending an authorization confirmation response to said merchant computer comprises verifying at least one of a consumer PIN entry, identification—password combination, biometric, data stored on a portable data device, and digital signature.

6. The method of claim 4, further comprising the steps of:
    reconciling accounts with said merchant computer; and
    billing an account associated with said consumer computer through existing billing statement processes.

7. The method of claim 4, wherein consumer identifiable billing information is absent from said payment request.

8. The method of claim 4, wherein each step occurs in real-time.

9. The method of claim 4, further comprising receiving a transaction fee from an account associated with at least one of said merchant computer and said consumer computer.

10. A machine-readable medium having stored thereon a plurality of instructions, said plurality of instructions when executed by a processor, cause said processor to perform a method comprising the steps of:
    receiving a payment request from a merchant computer, wherein said payment request resulted from a consumer computer, and wherein a consumer computer supplied account number identifier, a consumer computer identifier, and payment manager system supplied transaction information are absent from said payment request;
    transmitting a payment authorization request to said consumer computer;
    receiving a payment authorization response from said consumer computer comprising a secure consumer authentication entry; and,
    transmitting an authorization confirmation response to said merchant computer.

* * * * *